May 27, 1924.
C. G. STRANDLUND
GANG PLOW
Original Filed July 8, 1919    2 Sheets-Sheet 1
1,495,454
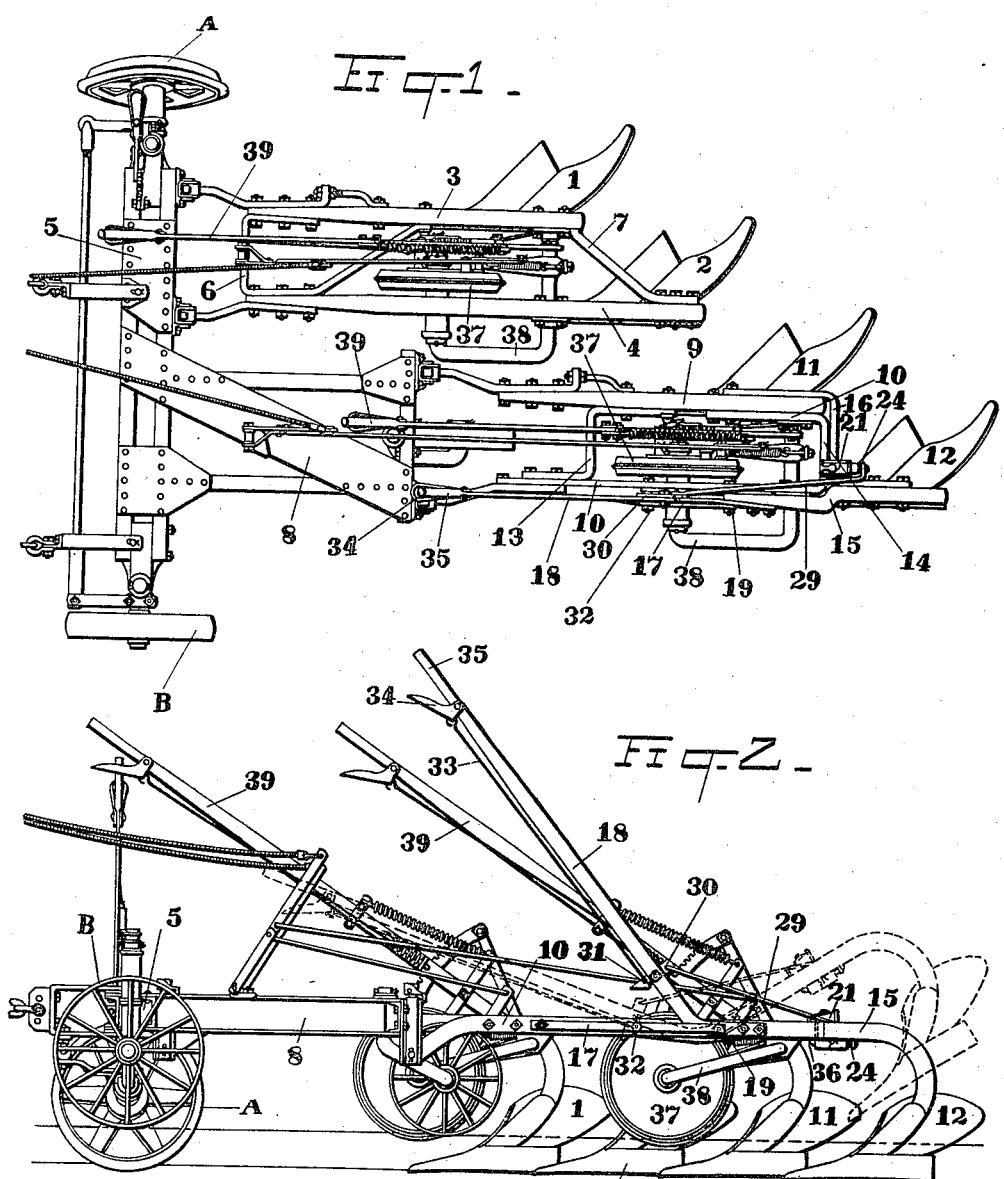

May 27, 1924.
C. G. STRANDLUND
GANG PLOW
Original Filed July 8, 1919    2 Sheets-Sheet 2
1,495,454
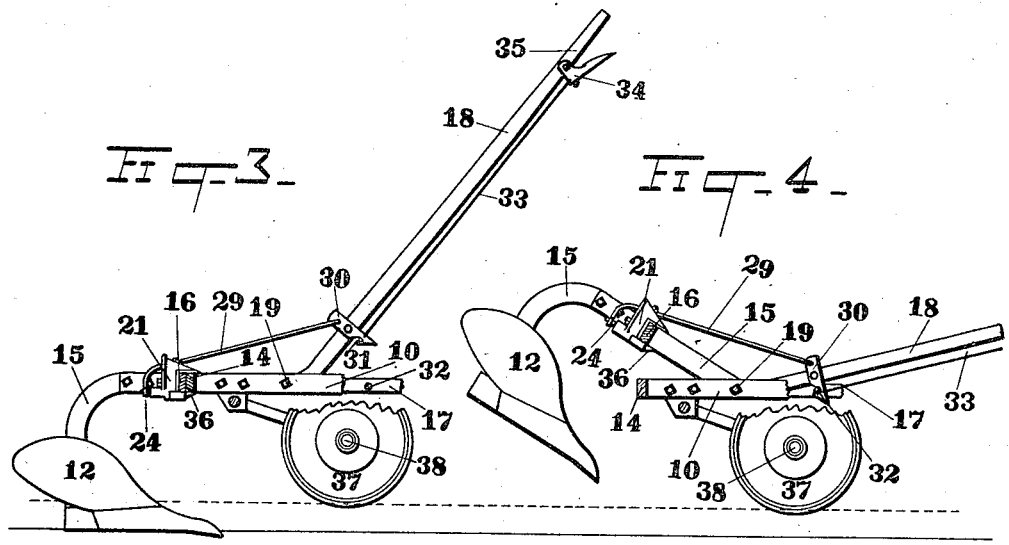
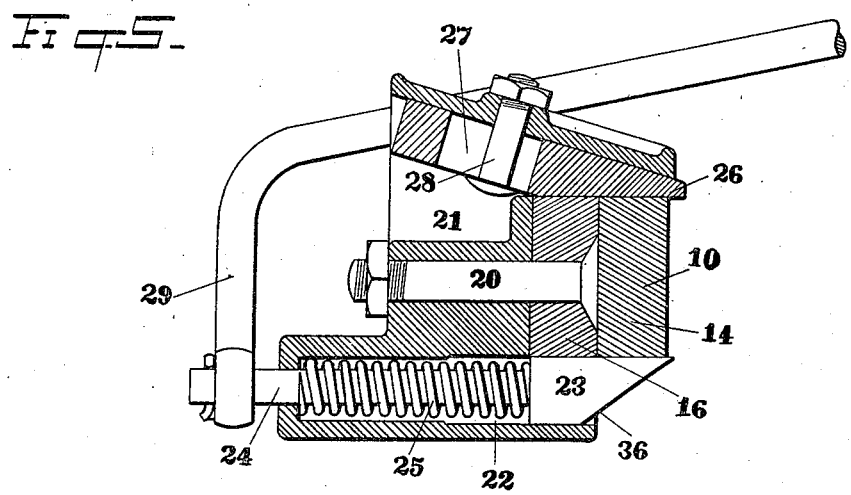
Witness
Wm. S. Morris.
Inventor
Carl G. Strandlund
W. C. Johnston
Attorney Patented May 27, 1924.

1,495,454

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

GANG PLOW.

Application filed July 8, 1919, Serial No. 309,493. Renewed October 31, 1923.

*To all whom it may concern:*

Be it known that I, CARL G. STRANDLUND, a citizen of the United States, residing at Moline, in the county of Rock Island and State of Illinois, have invented certain new and useful Improvements in Gang Plows, of which the following is a specification, reference being had therein to the accompanying drawing.

My invention relates to gang plows and more particularly to that type of plows having the plow bodies rigidly connected together in units of two, and the object of my invention is to provide means whereby the landward plow may be raised independently of the remaining plows to relieve that strain upon the draft power or to lessen the number of furrows.

Referring to the drawings in which similar numerals indicate identical parts—

Figure 1 is a plan view of a gang plow embodying my invention.

Figure 2 is a side elevation of Figure 1 showing, in dotted lines, the landward plow raised.

Figure 3 is a detail of the landward plow as lowered for plowing and the means employed to lock it in position.

Figure 4 is similar detail to Figure 3 but showing the plow raised the means by which it is held in a raised position, and Figure 5 is an enlarged detail of the lock by which the plow is held in operative position.

As illustrated the plow consists of two units of two plow bodies each, I do not confine myself to this construction however, for as many units may be employed as can be practically operated. The plows are arranged diagonally, the first or furrowward unit comprising plow bodies 1 and 2 secured respectively to beams 3 and 4 which are pivotally connected, for vertical adjustment to the cross beam 5 of the main frame which is supported on wheels A and B. The beams 3 and 4 are spaced apart and rigidly connected by braces 6 and 7.

On a rearward extension 8 of the main frame the landward unit is pivotally connected for vertical adjustment, and comprises beams 9 and 10 carrying plow bodies 11 and 12, the beams 9 and 10 being rigidly connected together by braces 13 and 14, the latter being preferably integral with the beam 10, and a brace 16 which is rigidly secured to the beam 15 and extends to pivotal connection with the beam 9 opposite the pivot of the latter on the beam 10, the landward plow body 12 is carried by the beam 15. Pivotally mounted on the beam 10, intermediate its ends is a supplemental beam consisting of the beam 15 and the brace 16.

A bar 17 is rigidly secured to the beam 10, by suitable bolts, and is spaced apart therefrom for the mounting and play of a lever 18 which is rigidly secured to the supplemental beam 15 and is pivoted on the beam 10 preferably by the rear bolt 19 which forms the landward pivot of the forward end of the supplemental beam 15.

Secured on the rear of the brace 16, by a bolt 20, is a member 21 having a chamber 22 on its lower side for the reception of a locking bolt 23 the stem 24 of which projects movably through the rear wall of the chamber. A coil spring 25 is on the stem 24 within the chamber 23 between the rear wall of the latter and the head of the locking bolt 23. The upper portion of the member 21 is declined forwardly and forms a housing within which is secured a wedge shaped block 26 adapted to rest on the brace 14, when the plow 12 is lowered, and adjustable, to compensate for wear, through a slot 27 and a bolt 28 extending through said slot and the top of the member 21.

Secured on the rear end of the locking bolt stem 24 is a rod 29 which is bent to extend forwardly to pivoted connection with a dog 30 which is pivotally mounted on the lever 18. The underside of the dog 30 near its forward end is provided with a notch 31 to automatically engage with a bolt 32 to hold the lever 18 down when the latter is operated in raising the plow 12, the free end of the dog 30 is beveled, adjacent the notch 31, to facilitate its engagement with the bolt 32. To release the dog from the bolt 32 I connect the latter, by a rod 33, to a rocking grip 34 mounted on the upper end of the lever 18.

As shown in Figures 2 and 3 the plows are down in plowing position; now if the operation of so many plows is beyond the capacity of the draft power, the landward plow can be raised to reduce the resistance to the draft. As explained when the plows are down the landward plow 12 is locked down, but if it is desirable to raise this plow to lighten the draft, I grasp the handle 35 of the lever 18 at the same time rocking the grip 34 toward the lever; as the grip 34 is connected to the dog 30 the latter is rocked by the operation of the grip and the rod 29 is moved in a rearward direction drawing the locking bolt 23 from under the brace 14, a forward rocking of the lever 18 will now raise the plow 12, the movement of the lever continuing until the dog 30 has engaged with the bolt 32 when the plow 12 is held in a raised position as shown in dotted lines in Figure 2 and in full lines in Figure 4.

To lower the plow the dog 30 is disengaged from the bolt 32 by rocking the grip 34, the plow then descends until the beveled under side 36 of the locking bolt 23 contacts with the upper rear edge of the brace 14, the weight of the plow, by reason of the beveled edge 36, forcing the bolt 23 rearward against the spring 25. Continuing the operation the point of the locking bolt traverses downward against the rear of the brace 14 until the under side has been reached when the pressure of the spring 25 will force the locking bolt 23 forward until its head is under the brace 14 as shown in Figure 5, the locking bolt 23 thus preventing the plow 12 from rising, and with the block 26 resting on top of the brace 14, holding the plow securely in position for operation.

As before explained and as illustrated, the plowing units consist of two plows each, each unit being provided with a wheel 37 mounted on a crank axle 38, journaled on the frame of each unit, and having a lever 39 which is operable to raise each unit by rocking the crank axle, or the traction power of the wheels 37 may be employed to raise the unit, in either event the landward unit including plows 11 and 12 can be raised, but only in the latter unit is the landward plow 12 capable of being raised independently of the adjoining plow 11 of the same and landward unit, the one lever employed for the purpose of raising the plow 12 controlling the means utilized for locking the plow either in a raised or lowered position.

What I claim is—

1. In a gang plow, the combination of a plowing unit comprising two plow beams rigidly connected together, a plow body rigidly secured on the furrowward beam, a supplemental beam pivotally secured at its forward end on the landward beam, a plow body carried by the supplemental beam, means to raise said plow bodies simultaneously, and means to raise the landward plow independently of the landward beam and the adjacent beam and plow body.

2. In a gang plow, the combination of a plowing unit comprising two plow beams rigidly connected together, a plow body rigidly secured on the furrowward beam, a supplemental beam pivotally secured at its forward end on the landward beam intermediate the ends thereof, a plow body carried by the supplemental beam, means to raise said beams and plow bodies simultaneously, and means to raise the supplemental beam and landward plow body independently of the landward beam and adjacent beam and plow body.

3. In a gang plow, the combination of a plowing unit comprising two plow beams rigidly connected together, a plow body rigidly secured on the furrowward beam, a supplemental beam pivotally mounted at its forward end on the furrowward beam, a brace secured to the supplemental beam and pivotally connected to the landward beam, a plow body carried by the supplemental beam, means to raise said beams and plow bodies simultaneously, and means to raise the supplemental beam and landward plow body independently of the landward beam and the other beam and plow body.

4. In a gang plow, the combination of a plowing unit comprising two plow beams rigidly connected together, a plow body rigidly secured to the furrowward beam, a supplemental beam pivotally mounted at its forward end on the furrowward beam intermediate their ends and the landward beam, a plow body carried by the supplemental beam, means to raise said beams and plow bodies simultaneously, means to raise the supplemental beam and landward plow body independently of the landward beam and the other beam and plow body, and means to lock the supplemental beam in a raised position or when lowered to an operative position.

5. In a gang plow, the combination of a plowing unit comprising two plow beams rigidly connected together, a plow body rigidly secured to the furrowward beam, a supplemental beam pivotally mounted at its forward end on the furrowward and landward beams, a plow body carried by the supplemental beam, means to raise said beams and plow bodies simultaneously, a lever rigidly mounted on the supplemental beam and operative to raise the latter independently of the landward beam and the other beam and plow body, and means on said lever and landward beam automatically co-operating to hold the supplemental beam in a raised position.

6. In a gang plow, the combination of a plowing unit comprising two plow beams rigidly connected together, a plow body rigidly secured on the furrowward beam, a supplemental beam pivotally mounted on the furrowward and landward beams, a plow body carried by the supplemental beam, means to raise said beams and plow bodies simultaneously, a lever rigidly mounted on the supplemental beam and operative to raise the latter, a locking device mounted on the supplemental beam and adapted to engage with the landward beam to hold the supplemental beam down, a connection between said locking device and the lever, and means on the lever operable to disengage said locking device to permit raising of the supplemental beam by operation of the lever.

7. In a gang plow, the combination of a plowing unit comprising two plow beams rigidly connected together, a plow body rigidly secured on the furrowward beam, a supplemental beam pivotally mounted on the furrowward beam and the landward beam, a plow body carried by the supplemental beam, means to raise said beams and plow bodies simultaneously, means on the supplemental beam operable to raise or lower the latter about its pivot independently of the other beams, a plurality of latch devices operating respectively to hold the supplemental beam in a raised or lowered position, and a common controller for said devices.

8. In a gang plow having two plow bodies normally operating together, means operative to raise the plow bodies simultaneously, a lever operative to raise the landward plow body, a latch device to hold the plow bodies together in joint operation, and a latch device to hold the landward plow body in a raised position, said lever controlling the operation of both latches.

CARL G. STRANDLUND.

Certificate of Correction.

It is hereby certified that in Letters Patent No. 1,495,454, granted May 27, 1924, upon the application of Carl G. Strandlund, of Moline, Illinois, for an improvement in "Gang Plows," errors appear in the printed specification requiring correction as follows: Page 1, line 62, after the word "ends" insert a comma; page 2, lines 95 and 96, claim 4, strike out the words "intermediate their ends" and insert the same to follow after the word "beam", line 96; and that the said Letters Patent should be read with these corrections therein that the same may conform to the record of the case in the Patent Office.

Signed and sealed this 5th day of August, A. D. 1924.

[SEAL.]

WM. A. KINNAN,
*Acting Commissioner of Patents.*